United States Patent
Hebrink et al.

(10) Patent No.: US 10,914,878 B2
(45) Date of Patent: Feb. 9, 2021

(54) MULTILAYER FILM INCLUDING HIDDEN FLUORESCENT FEATURES

(71) Applicant: 3M INNOVATIVE PROPERTIES COMPANY, St. Paul, MN (US)

(72) Inventors: Timothy J. Hebrink, Scandia, MN (US); Todd G. Pett, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/464,123

(22) PCT Filed: Dec. 12, 2017

(86) PCT No.: PCT/US2017/065780
§ 371 (c)(1),
(2) Date: May 24, 2019

(87) PCT Pub. No.: WO2018/118524
PCT Pub. Date: Jun. 28, 2018

(65) Prior Publication Data
US 2019/0302333 A1    Oct. 3, 2019

Related U.S. Application Data

(60) Provisional application No. 62/436,858, filed on Dec. 20, 2016.

(51) Int. Cl.
*G02B 5/26* (2006.01)
*B42D 25/382* (2014.01)
(Continued)

(52) U.S. Cl.
CPC ............. *G02B 5/26* (2013.01); *B42D 25/328* (2014.10); *B42D 25/355* (2014.10);
(Continued)

(58) Field of Classification Search
CPC ........ G02B 5/26; G02B 5/0891; G02B 5/285; G02B 5/0841; G02B 5/0833; G02B 5/283;
(Continued)

(56) References Cited

U.S. PATENT DOCUMENTS

| 6,045,894 A | 4/2000 | Jonza |
| 6,506,480 B2 | 1/2003 | Liu |

(Continued)

FOREIGN PATENT DOCUMENTS

| DE | 102008036402 | 9/2009 |
| WO | WO 98-022291 | 5/1998 |
| WO | WO 2012-012177 | 1/2012 |

OTHER PUBLICATIONS

International Search Report for PCT International Application No. PCT/US2017/065780, dated Jun. 4, 2018, 7 pages.

*Primary Examiner* — David P Porta
*Assistant Examiner* — Meenakshi S Sahu
(74) *Attorney, Agent, or Firm* — Bradford B. Wright

(57) ABSTRACT

Various embodiments disclosed relate to multilayer films including hidden fluorescent features. The present disclosure includes a multilayer optical film including an isotropic multilayer optical film having first and second opposed major surfaces. The isotropic multilayer optical film reflects at least 50% of a light that is at least one of ultraviolet light or visible light, having an incident angle less than a cutoff angle from normal to the first major surface of the isotropic multilayer optical film, wherein the cutoff angle is in a range from 10° to 70°. The isotropic multilayer optical film allows at least 50% of the light having an incident angle of more than the cutoff angle from normal to the first major surface of the isotropic multilayer optical film to pass through the isotropic multilayer optical film. The isotropic multilayer optical film includes a marking on the second major surface (Continued)

of the isotropic multilayer optical film, the marking including at least one fluorescent compound. Various embodiments of multilayer optical films described herein are useful, for example, as anti-counterfeiting features, such as in identification documents or cards, currency, labels for pharmaceuticals or other high value products, or financial cards.

13 Claims, 4 Drawing Sheets

(51) Int. Cl.
*B42D 25/387* (2014.01)
*G01N 21/64* (2006.01)
*G02B 5/20* (2006.01)
*G02B 5/08* (2006.01)
*G02B 5/28* (2006.01)
*B42D 25/328* (2014.01)
*B42D 25/355* (2014.01)
*B42D 25/23* (2014.01)
*B42D 25/28* (2014.01)
*B42D 25/29* (2014.01)

(52) U.S. Cl.
CPC ......... *B42D 25/382* (2014.10); *B42D 25/387* (2014.10); *G01N 21/6447* (2013.01); *G02B 5/0833* (2013.01); *G02B 5/0841* (2013.01); *G02B 5/0891* (2013.01); *G02B 5/208* (2013.01); *G02B 5/283* (2013.01); *G02B 5/285* (2013.01); *G02B 5/287* (2013.01); *B42D 25/23* (2014.10); *B42D 25/28* (2014.10); *B42D 25/29* (2014.10)

(58) Field of Classification Search
CPC ...... G02B 5/287; G02B 5/208; B42D 25/328; B42D 25/355; B42D 25/382; B42D 25/387; B42D 25/23; B42D 25/28; B42D 25/29; G01N 21/6447
See application file for complete search history.

(56) References Cited

U.S. PATENT DOCUMENTS

| | | |
|---|---|---|
| 6,783,349 B2 | 8/2004 | Neavin |
| 7,064,897 B2 | 6/2006 | Hebrink |
| 9,101,956 B2 | 8/2015 | Merrill |
| 9,423,545 B2 | 8/2016 | Merrill |
| 9,459,386 B2 | 10/2016 | Hebrink |
| 2002/0114929 A1* | 8/2002 | Liu .............. G02B 5/223 428/195.1 |
| 2008/0037127 A1* | 2/2008 | Weber ............ G02B 6/0011 359/586 |
| 2011/0255163 A1 | 10/2011 | Merrill |
| 2012/0087010 A1 | 4/2012 | Meis |

* cited by examiner

MULTILAYER FILM INCLUDING HIDDEN FLUORESCENT FEATURES

CROSS REFERENCE TO RELATED APPLICATIONS

This application is a national stage filing under 35 U.S.C. 371 of PCT/US2017/065780, filed Dec. 12, 2017, which claims the benefit of U.S. Application No. 62/436,858, filed Dec. 20, 2016, the disclosure of which is incorporated by reference in its/their entirety herein.

BACKGROUND

Counterfeiting can be a significant problem for a wide range of industries and markets including manufactured goods such as clothing, toys, pharmaceuticals, and other areas (e.g., security documents and currency). Counterfeiting has significant economic impact on those affected but it can also present issues of safety (e.g., pharmaceuticals and personal protective equipment) and national security (e.g., driver's licenses, passports, and currency). It is desirable to keep ahead of the counterfeiters by developing new security features that are difficult to copy.

SUMMARY

In one aspect, the present disclosure provides a multilayer optical film including an isotropic multilayer optical film. The isotropic multilayer optical film has first and second opposed major surfaces. The isotropic multilayer optical film reflects at least 50% of a light that is at least one of ultraviolet light or visible light, having an incident angle less than a cutoff angle from normal to the first major surface of the isotropic multilayer optical film, wherein the cutoff angle is in a range from 10° to 70°. The isotropic multilayer optical film allows at least 50% of the light having an incident angle of more than the cutoff angle from normal to the first major surface of the isotropic multilayer optical film to pass through the isotropic multilayer optical film. The multilayer optical film also includes a marking on the second major surface of the isotropic multilayer optical film, the marking including at least one fluorescent compound.

In another aspect, the present disclosure provides a multilayer optical film including an isotropic polymeric multilayer optical film having a first and second, opposed major surfaces. The isotropic polymeric multilayer optical film has in a range of 100 to 2,000 layers total of alternating first and second polymeric optical layers. The first polymeric optical layers have a first composition and the second polymeric optical layers have a second, different, composition. The isotropic multilayer optical film reflects at least 50% of a light that is ultraviolet light having an incident angle less than a cutoff angle from normal to the first major surface of the isotropic polymeric multilayer optical film, wherein the cutoff angle is in a range from 20° to 55°. The isotropic multilayer optical film allows at least 50% of the light having an incident angle of more than the cutoff angle from normal to the first major surface of the isotropic polymeric multilayer optical film to pass through the isotropic multilayer optical film. The multilayer optical film also includes a marking on the second major surface of the isotropic polymeric multilayer optical film, the marking including a fluorescent compound.

In another aspect, the present disclosure provides a method of making the multilayer optical film including applying the marking to the second major surface of the isotropic multilayer optical film to form the multilayer optical film.

In another aspect, the present disclosure provides a multilayered optical film-structured surface composite including an embodiment of the multilayered optical film, and also including a structured surface having a first major surface and a second, opposed major surface. The second major surface of the structured surface is in contact with the first major surface of the isotropic multilayer optical film. The structured surface redirects the light approaching the first major surface of the structured surface such that the light entering the first major surface of the structured surface has an incident angle with respect to the first major surface of the structured surface that is different than the angle of light exiting the second major surface of the structured surface with respect to the first major surface of the isotropic multilayer optical film.

In another aspect, the present disclosure provides a method of making the multilayer optical film-structured material composite. The method includes applying the second major surface of the structured material to the first major surface of the multilayer optical film to form the multilayer optical film-structured material composite.

In various embodiments, the multilayer optical film of the present disclosure can provide certain advantages over other multilayer optical films, at least some of which are unexpected. For example, in various embodiments, the combination of the isotropic multilayer optical film and the fluorescent marking on the back thereof together function as a feature that is both difficult to copy and simple to detect for a person trained to detect the feature. In various embodiments, the fluorescent marking is invisible in regular (non-ultra violet (UV)) light, providing a copy protection feature that is discreet and that can be present without disturbing the normal appearance of an item.

In various embodiments, the combination of features such as the multilayer optical film, the fluorescent marking, and the angle-dependent viewing of the marking can make the multilayer optical film harder to copy as compared to other anti-counterfeiting features such as other multilayer optical films or other fluorescent markings.

In various embodiments, the multilayer optical film can provide an added level of security, be harder to copy, easier to detect, less expensive to generate, faster to generate, or a combination thereof, as compared to other anti-counterfeiting features such as color shifting multilayer optical films. In various embodiments, existing and prevalent light sources such as those designed for anti-counterfeit verification can be used with the multilayer optical film. In various embodiments, polarized UV light sources can be used to provide an additional level of security since one polarization of UV light will transmit more than the other polarization of UV light and thus one polarization of UV light will excite the fluorescent molecule before the other polarization of UV light.

Various embodiments of multilayer optical films described herein are useful, for example, as anti-counterfeiting features, such as in identification documents or cards, currency, labels for pharmaceuticals or other high value products, or financial cards.

BRIEF DESCRIPTION OF THE DRAWINGS

The drawings illustrate generally, by way of example, but not by way of limitation, various embodiments of the present disclosure.

DETAILED DESCRIPTION

Figure 1:
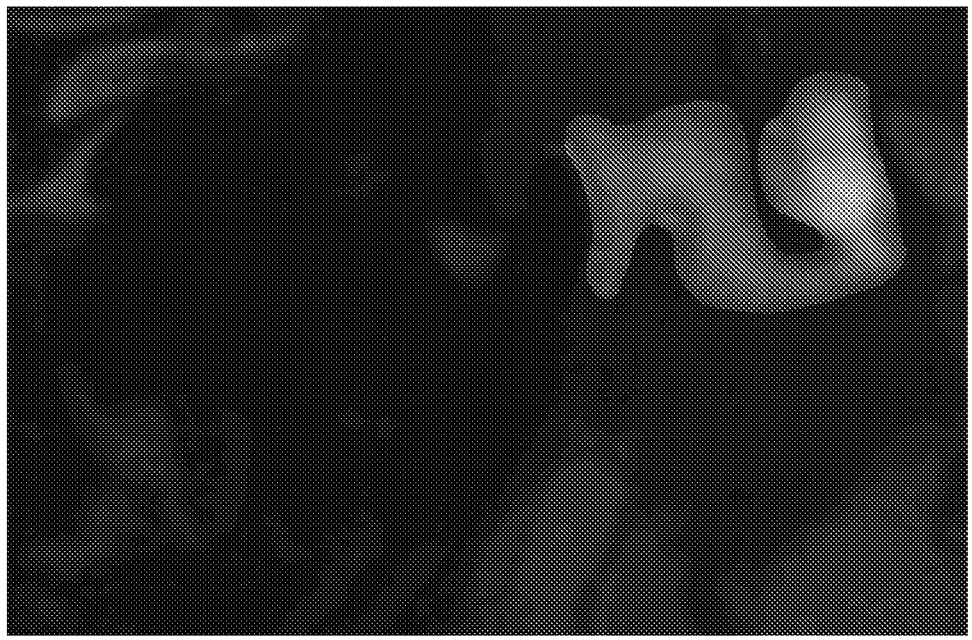
FIG. 1 illustrates an exemplary multilayer optical film described herein that is UV illuminated at an angle normal to the surface of the film, showing no fluorescence of the fluorescent markings on the back side of the film.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "isotropic" as used herein refers to a material in which light travels at the same speed through the material no matter which direction it is travelling in the material. For example, the refractive index of an isotropic material can be independent of the polarization and propagation direction of the light.

The term "ultraviolet light" or "UV light" as used herein refers to light having at least one wavelength in the range of 200 nm to 400 nm.

The term "visible light" as used herein refers to light that is visible to the human eye or having at least one wavelength in the range of 400 nm to 700 nm.

The term "near infrared light" as used herein refers to light having at least one wavelength in the range of 700 nm to 14,000 nm.

The term "incident angle" as used herein with respect to a surface refers to the angle between a light ray and a vector normal to that surface at the point of incidence.

Multilayer Optical Film

In various embodiments, the present disclosure provides a multilayer optical film including an isotropic multilayer optical film having first and second opposed major surfaces. The isotropic multilayer optical film can reflect at least 50% of a light that is at least one of ultraviolet light or visible light, having an incident angle less than a cutoff angle from normal to the first major surface of the isotropic multilayer optical film. The cutoff angle can be in a range from 10° to 70°. The isotropic multilayer optical film can allow at least 50% of the light having an incident angle of more than the cutoff angle from normal to the first major surface of the isotropic multilayer optical film to pass through the isotropic multilayer optical film. The multilayer optical film also includes a marking on the second major surface of the isotropic multilayer optical film, the marking including at least one fluorescent compound.

The light can approach the first major surface of the isotropic multilayer optical film. Such light having an incident angle greater than the cutoff angle from normal to the first major surface of the isotropic multilayer optical film can pass through the film and can cause the fluorescent compound to fluoresce. The fluorescing of the fluorescent compound can occur in at least one of the visible light range and the near infrared light range and can be visible from the first major surface of the isotropic multilayer optical film. The light approaching the first major surface of the isotropic multilayer optical film can be at least one of ultraviolet light, visible light, polarized light, polarized ultraviolet light, or polarized visible light.

The isotropic multilayer optical film can reflect at least 50% (in some embodiments, 50% to 100%, or at least 55%, 60, 65, 70, 75, 80, 85, 90, 95, 96, 97, 98%, or 99% or more) of a light that is at least one of ultraviolet light or visible light, having an incident angle less than a cutoff angle from normal to the first major surface of the isotropic multilayer optical film. The isotropic multilayer optical film can allow at least 50% (in some embodiments, 50% to 100%, or at least 55%, 60, 65, 70, 75, 80, 85, 90, 95, 96, 97, 98%, or 99% or more) of the light having an incident angle of more than the cutoff angle from normal to the first major surface of the isotropic multilayer optical film to pass through the isotropic multilayer optical film. In some embodiments, at the cutoff angle the isotropic multilayer optical film can reflect 50% and can allow 50% of a light that is at least one of ultraviolet light or visible light, having an incident angle equal to a cutoff angle from normal to the first major surface of the isotropic multilayer optical film. The cutoff angle can be any suitable cutoff angle producible by the structures described herein. For example, the cutoff angle can in a range from 10° to 70°, 20° to 55°, 30° to 55°, or 10° or less, or less than, equal to, or greater than 12°, 14°, 16°, 18°, 20°, 22°, 24°, 26°, 280, 30°, 32°, 34°, 36°, 38°, 40°, 42°, 44°, 46°, 48°, 50°, 52°, 54°, 56°, 58°, 60°, 62°, 64°, 66°, 68°, or 70° or more.

In some embodiments, the isotropic multilayer optical film can have a reflection band edge at an incident angle of 0 degrees from normal to the first major surface of the isotropic multilayer optical film that is different than a band edge at an incident angle that differs from normal to the first major surface of the isotropic multilayer optical film by the cutoff angle.

The marking can be free of fluorescence (i.e., have no fluorescence) from the light having an incident angle to the first major surface of the isotropic multilayer optical film less than an invisibility angle from normal to the first major surface of the isotropic multilayer optical film. The invisibility angle can be any suitable invisibility angle producible by the structures described herein, for example, in a range of 5° to 30°, 10° to 25°, or 5° or less, or less than, equal to, or greater than 6°, 7°, 8°, 9°, 100, 11, 12°, 13°, 14°, 15°, 16°, 17°, 18°, 19°, 20°, 21°, 22°, 23°, 24°, 25°, 26°, 27°, 28°, 29°, or 30° or more.

The isotropic multilayer optical film can reflect in a range between 0% to 100% (in some embodiments, in a range of 1% to 99% of light, or 10% to 90%, or 20% to 80%, or 1% or less, or less than, equal to, or greater than 2%, 4, 6, 8, 10, 15, 20, 25, 30, 35, 40, 45, 50, 55, 60, 65, 70, 75, 80, 85, 90, 92, 94, 96, 98, or 99% or more) of the light having an incident angle in a range from 0° to 70° from normal to the first major surface (in some embodiments, light having an incident angle in a range from 10° to 70° from normal to the first major surface, 20° to 55°, 30° to 55°, or 10° or less, or less than, equal to, or greater than 12°, 14°, 16°, 18°, 20°, 22°, 24°, 26°, 28°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 58°, 60°, 62°, 64°, 66°, 68°, or 70° or more). The isotropic multilayer optical film can reflect 0% of the light having an incident angle of greater than 10° to 70° from normal to the first major surface of the isotropic multilayer optical film, for example, 30° or less, or less than, equal to, or greater than 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 58°, 60°, 62°, 64°, 66°, 68°, or 70° or more.

The isotropic multilayer optical film can have any suitable thickness and total number of layers such that it can be used as described herein. The isotropic multilayer optical film can have a thickness in the range of from 1 micrometer to 500 micrometers, for example, 10 micrometers to 50 micrometers, or 1 micrometer or less, or less than, equal to, or greater than 2 micrometers, 3, 4, 5, 6, 8, 10, 12, 14, 16, 18, 20, 25, 30, 35, 40, 45, 50, 60, 70, 80, 90, 100, 125, 150, 175, 200, 250, 300, 400 micrometers, or 500 micrometers or more. The isotropic multilayer optical film can have a total number of layers in a range from 10 to 2,000 layers, for example, 20 to 700 layers, or 10 layers or less, or less than, equal to, or greater than 15 layers, 20, 25, 30, 35, 40, 45, 50, 60, 70, 80, 90, 100, 110, 120, 130, 140, 150, 200, 220, 240, 260, 280, 300, 320, 340, 360, 380, 400, 420, 440, 460, 480, 500, 520, 540, 560, 580, 600, 620, 640, 680, 700, 750, 800, 850, 900, 950, 1,000, 1,100, 1,200, 1,400, 1,600, 1,800, or 2,000 layers or more.

The isotropic multilayer optical film can include alternating first optical layers and second optical layers. The first layers can have a first composition and the second layers can have a second, different, composition. The first layers can have a first refractive index and the second layers can have a second, different, refractive index. Each of the first and second optical layers independently can have a thickness in a range from 2 nm to 300 nm, for example, from 50 nm to 200 nm, or 2 nm or less, or less than, equal to, or greater than 3 nm, 4, 5, 6, 8, 10, 12, 14, 16, 18, 20, 25, 30, 35, 40, 45, 50, 60, 70, 80, 90, 100, 120, 140, 160, 180, 200, 220, 240, 250, or 300 nm or more.

The isotropic multilayer optical film can be at least one of an isotropic polymeric multilayer optical film or an isotropic inorganic multilayer optical film. The isotropic multilayer optical film can be an isotropic polymeric multilayer optical film including a plurality of alternating first and second polymeric optical layers. The first polymeric optical layers can have a first composition and the second optical polymeric layers can have a second, different, composition. The first optical polymeric layers can have a first refractive index and the second optical polymeric layers have a second, different, refractive index.

The first and second polymeric optical layers can independently include, for example, at least one of a polycarbonate, an epoxy-containing polymer, a poly(epoxy-containing monomer), a vinyl polymer, a cyclic olefin polymer, a poly(phenylene oxide), a polysulfone, a polyamide, a polyurethane, a polyethylene, a polypropylene, a polyamic acid, a polyimide, a polyester, a fluoropolymer, a polydimethylsiloxane, a poly(alkylene terephthalate), a poly(alkylene napthalate), a silicone polymer, a cellulose derivative, an ionomer, or a copolymer thereof. The first and second polymeric optical layers can independently include, for example, at least one of poly(carbonate) (PC); syndiotactic or isolactic poly(styrene) (PS); ($C_1$-$C_8$)alkyl styrenes, alkyl, aromatic, or aliphatic ring-containing acrylates or (meth)acrylates, including poly(methylmethacrylate) (PMMA) or PMMA copolymers; ethoxylated or propoxylated acrylate or (meth)acrylates; multifunctional acrylates or (meth)acrylates; acrylated epoxies; epoxies; or other ethylenically unsaturated materials, cyclic olefins or cyclic olefinic copolymers; acrylonitrile butadiene styrene (ABS); styrene acrylonitrile copolymers (SAN); epoxies, poly(vinylcyclohexane); PMMA/poly(vinylfluoride) blends; poly (phenylene oxide) alloys; styrenic block copolymers; polyimide; polysulfone; poly(vinyl chloride); poly(dimethyl siloxane) (PDMS); polyurethanes; unsaturated polyesters; poly(ethylene), including low birefringence polyethylene; poly(propylene) (PP); poly(alkylene terephthalates), such as poly(ethylene terephthalate) (PET); poly(alkylene napthalates), such as poly(ethylene naphthalate)(PEN); polyamide, ionomers; vinyl acetate/polyethylene copolymers; cellulose acetate; cellulose acetate butyrate; fluoropolymers; poly (styrene)-poly(ethylene) copolymers; PET or PEN copolymers, including polyolefinic PET or PEN; or poly(carbonate)/aliphatic PET blends. The first polymeric optical layer can be, for example, polycarbonate and the second polymeric optical layer can be a blend of poly(methyl methacrylate) and polyvinylidene fluoride. The second polymeric optical layer can be a 1:100 to 100:1 by weight blend of poly(methyl methacrylate) and polyvinylidene fluoride, for example, 1:10 to 10:1, or 1:3 to 3:1, or 1:100 or less, or less than, equal to, or greater than 1:80, 1:60, 1:40, 1:20, 1:10, 1:8, 1:6, 1:4, 1:2, 1:1, 2:1, 4:1, 6:1, 8:1, 10:1, 20:1, 40:1, 60:1, 80:1, 100:1.

The isotropic multilayer optical film can be an isotropic inorganic multilayer optical film including a plurality of first and second inorganic optical layers. The first inorganic optical layers have a first composition and the second optical inorganic layers have a second, different, composition, and wherein the first optical inorganic layers have a first refractive index and the second optical inorganic layers have a second, different, refractive index. The first inorganic optical layer and the second inorganic optical layer can independently include, for example, at least one of titania, silica, zirconia, alumina, ceria, antimony oxide, zinc oxide, hafnia, zinc selenide, sodium alumina fluoride, lanthanum oxide, or tantalum oxide.

The marking including the fluorescent compound can be at least one of a picture, a shape, a design, a pattern, a letter, a word, an indicia, a graphical image, or a layer. For example, the marking can be a fluorescent layer on the isotropic multilayer optical film, such as a layer including a polymer containing a fluorescent compound or it can be a fluorescent polymer such as PEN (polyethylene napthalate). The layer can be attached to the isotropic multilayer optical film by a coating method, printing method (e.g., screen, inkjet, offset, and the like), extrusion coating, or co-extrusion. The marking including the fluorescent compound can be visible in visible light (e.g., having at least one wavelength in the visible light range) or invisible in visible light (e.g., free of wavelengths in the visible light range (i.e., no wavelengths in the visible light range)).

In some embodiments, the fluorescent compound can have an excitation band in the ultraviolet light range and can have an emission band in the visible light range. In some embodiments, the at least one fluorescent compound can include a first fluorescent compound having an excitation band in the range of 350 nm to 400 nm and a second fluorescent compound having an excitation band in the range of 250 nm to 400 nm, or 300 nm to 350 nm.

In various embodiments, the present disclosure provides a method of making the multilayer optical film described herein. The method can be any suitable method that forms an embodiment of the multilayer optical film described herein. For example, the method can include applying the marking to the second major surface of the isotropic multilayer optical film to form the multilayer optical film.

Multilayer Optical Film-Structured Material Composite

In various embodiments, the present disclosure provides a multilayered optical film-structured surface composite including an embodiment of the multilayered optical film described herein, and also including a structured surface. The structured surface has a first major surface and a second, opposed major surface. The second major surface of the structured surface is in contact with or proximate to the first major surface of the isotropic multilayer optical film. The structured surface redirects the light approaching the first major surface of the structured surface such that the light entering the first major surface of the structured surface has an incident angle with respect to the first major surface of the structured surface that is different than the angle of light exiting the second major surface of the structured surface with respect to the first major surface of the isotropic multilayer optical film.

An angle of light exiting the second major surface of the structured surface with respect to the first major surface of the isotropic multilayer optical film can differ from an incident angle of the light entering the first major surface of the structured surface by an amount equal to a redirection angle. The multilayered optical film-structured surface composite can reflect at least 50% (in some embodiments, in a range of from 50% to 100%, or at least 55%, 60, 65, 70, 75, 80, 85, 90, 95, 96, 97, 98%, or 99% or more) of the light having an incident angle less than the cutoff angle minus the redirection angle from normal to the first major surface of the isotropic multilayer optical film. The multilayered optical film-structured surface composite can allow at least 50% (in some embodiments, in a range of from 50% to 100%, or at least 55%, 60, 65, 70, 75, 80, 85, 90, 95, 96, 97, 98%, or 99% or more) of the light having an incident angle of more than the cutoff angle minus the redirection angle from normal to the first major surface of the isotropic multilayer optical film to pass through the structured surface and the isotropic multilayer optical film. The redirection angle can be any suitable angle that can be produced by embodiments of the structured surface described herein, for example, in a range from 10° to 80°, 15° to 25°, or 10° or less, or 12°, 14°, 15°, 16°, 17°, 18°, 19°, 20°, 21°, 22°, 23°, 24°, 25°, 26°, 28°, 30°, 32°, 34°, 36°, 38°, 40°, 42°, 440, 46°, 48°, 50°, 52°, 54°, 56°, 58°, 60°, 62°, 64°, 66°, 68°, 70°, 72°, 74°, 76°, 78°, or 80° or more. The structured surface can redirect the light at least one of via refraction or total internal reflection.

At least some portions of the fluorescent marking on the second major surface of the isotropic multilayer optical film can be directly opposite the structured surface on the first major surface of the isotropic multilayer optical film. The multilayered optical film-structured surface composite can allow at least some of the light that approaches the first major surface of the structured surface at an incident angle that is normal to the first major surface of the isotropic multilayer optical film to pass through the structured surface and the isotropic multilayer optical film and cause at least some of the portions of the fluorescent marking on the second major surface of the isotropic multilayer optical film that are directly opposite the structured surface on the first major surface of the isotropic multilayer optical film to fluoresce. In some embodiments, the multilayered optical film-structured surface composite can allow at least some of the light that approaches the first major surface of the structured surface at any incident angle to the first major surface of the isotropic multilayer optical film to pass through the structured surface and the isotropic multilayer optical film and cause at least some of the portions of the fluorescent marking and the second major surface of the isotropic multilayer optical film that are directly opposite the structured surface on the first major surface of the isotropic multilayer optical film to visibly fluoresce as viewed from the first major surface of the structured surface.

At least some portions of the fluorescent marking on the second major surface of the isotropic multilayer optical film are not directly opposite the structured surface on the first major surface of the isotropic multilayer optical film. The multilayered optical film-structured surface composite can reflect the light that approaches portions of the first major surface of the isotropic multilayer optical film that are free of the structured surface (i.e., have no structured surface) at an incident angle that is normal to the first major surface of the isotropic multilayer optical film and thereby prevent at least some of the portions of the fluorescent marking on the second major surface of the isotropic multilayer optical film that are not directly opposite the structured surface on the first major surface of the isotropic multilayer optical film from fluorescing.

At least some portions of the fluorescent marking on the second major surface of the isotropic multilayer optical film can be directly opposite the structured surface on the first major surface of the isotropic multilayer optical film, while at least some portions of the fluorescent marking on the second major surface of the isotropic multilayer optical film can be not directly opposite the structured surface on the first major surface of the isotropic multilayer optical film. The multilayered optical film-structured surface composite can allow at least some of the light that approaches the first major surface of the structured surface at an incident angle that is normal to the first major surface of the isotropic multilayer optical film to pass through the structured surface and the isotropic multilayer optical film and cause at least some of the portions of the fluorescent marking on the second major surface of the isotropic multilayer optical film that are directly opposite the structured surface on the first major surface of the isotropic multilayer optical film to fluoresce. The multilayered optical film-structured surface composite can reflect the light that approaches portions of the first major surface of the isotropic multilayer optical film that are free of the structured surface at an incident angle that is normal to the first major surface of the isotropic multilayer optical film and thereby prevent at least some of the portions of the fluorescent marking on the second major surface of the isotropic multilayer optical film that are not directly opposite the structured surface on the first major surface of the isotropic multilayer optical film from fluorescing. The multilayered optical film-structured surface composite can allow at least some of the light that approaches the first major surface of the structured surface and that approaches the first major surface of the isotropic multilayer optical film at an incident angle to the first major surface of the isotropic multilayer optical film that is different than normal to the first major surface of the isotropic multilayer optical film to pass through the structured surface and the isotropic multilayered optical film and cause fluorescence of at least some of both of the portions of the fluorescent marking on the second major surface of the isotropic multilayer optical film that are directly opposite the structured surface on the first major surface of the isotropic multilayer optical film and the portions of the fluorescent marking on the second major surface of the isotropic multilayer optical film that are not directly opposite the structured surface on the first major surface of the isotropic multilayer optical film.

Various embodiments of the present disclosure provide a method of making the multilayer optical film-structured material composite. The method can be any suitable method that forms an embodiment of the multilayer optical film-structured material composite described herein. For example, the method can include applying the second major surface of the structured material to the first major surface of the multilayer optical film, or placing the second major surface of the structured material proximate to the first major surface of the multilayer optical film, to form the multilayer optical film-structured material composite.

Method of Using the Multilayer Optical Film or Multilayer Optical Film-Structured Material Composite Various embodiments of the present disclosure provide a method of using the multilayer optical film or multilayer optical film-structured material composite described herein. The method can include illuminating the first major surface of the isotropic multilayer optical film with the light. The method can include at least one of generating the light using an ultraviolet light source or generating the light using a visible light source. The light source can be a collimated light source. The ultraviolet or visible light can be polarized or non-polarized. The method can also include detecting whether the marking fluoresces. Detecting can include at least one of visual detection with the eye or electronic detection with a detector, such as a detector that detects at least one of visible light, ultraviolet light, or near infrared light.

Various embodiments of multilayer optical films described herein are useful, for example, as anti-counterfeiting features, such as in identification documents or cards, currency, labels for pharmaceuticals or other high value products, or financial cards.

Exemplary Embodiments

The following exemplary embodiments are provided, the numbering of which is not to be construed as designating levels of importance:
1A. A multilayer optical film comprising:
    an isotropic multilayer optical film having first and second opposed major surfaces, wherein the isotropic multilayer optical film:
        reflects at least 50% (e.g., 50% to 100%, or at least 55%, 60, 65, 70, 75, 80, 85, 90, 95, 96, 97, 98%, or 99% or more) of a light that is at least one of ultraviolet light or visible light, having an incident angle less than a cutoff angle from normal to the first major surface of the isotropic multilayer optical film, wherein the cutoff angle is in a range from 10° to 70° (e.g., 20° to 55°, or 30° to 550, or 10° or less, or less than, equal to, or greater than 12°, 14°, 16°, 18°, 20°, 22°, 24°, 26°, 28°, 30°, 32°, 34°, 36°, 38°, 40°, 42°, 440, 46°, 48°, 50°, 52°, 54°, 56°, 58°, 60°, 62°, 64°, 66°, 68°, or 70° or more), and
        allows at least 50% (e.g., 50% to 100%, or at least 55%, 60, 65, 70, 75, 80, 85, 90, 95, 96, 97, 98%, or 99% or more) of the light having an incident angle of more than the cutoff angle from normal to the first major surface of the isotropic multilayer optical film to pass through the isotropic multilayer optical film; and
    a marking on the second major surface of the isotropic multilayer optical film, the marking comprising at least one fluorescent compound.
2A. The multilayer film of Exemplary Embodiment 1A, wherein the light approaching the first major surface of the isotropic multilayer optical film and having an incident angle greater than the cutoff angle from normal to the first major surface of the isotropic multilayer optical film passes through the film and causes the fluorescent compound to fluoresce.
3A. The multilayer film of Exemplary Embodiment 2A, wherein the fluorescing of the fluorescent compound occurs in at least one of the visible light range or the near-infrared light range and is visible from the first major surface of the isotropic multilayer optical film.
4A. The multilayer optical film of any preceding A Exemplary Embodiment, wherein the light is ultraviolet light.
5A. The multilayer optical film of any preceding A Exemplary Embodiment, wherein the light is polarized light.
6A. The multilayer optical film of any preceding A Exemplary Embodiment, wherein the light approaches the first major surface of the isotropic multilayer optical film.
7A. The multilayer optical film of any preceding A Exemplary Embodiment, wherein the isotropic multilayer optical film reflects greater than 50% of the light having an incident angle less than 30° from normal to the first major surface of the isotropic multilayer optical film.

8A. The multilayer optical film of any preceding A Exemplary Embodiment, wherein the marking is free of fluorescence from the light having an incident angle to the first major surface of the isotropic multilayer optical film less than an invisibility angle from normal to the first major surface of the isotropic multilayer optical film, wherein the invisibility angle is in a range from 5° to 30° (e.g., 10° to 25°, or 5° or less, or less than, equal to, or greater than 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, or 30° or more).

9A. The multilayer optical film of any preceding A Exemplary Embodiment, wherein the isotropic multilayer optical film reflects less than 100% and more than 0% of the light (e.g., 1% to 99% of light, or 10% to 90%, or 20% to 80%, or 1% or less, or less than, equal to, or greater than 2%, 4, 6, 8, 10, 15, 20, 25, 30, 35, 40, 45, 50, 55, 60, 65, 70, 75, 80, 85, 90, 92, 94, 96, 98%, or 99% or more of light) having an incident angle in a range from 10° to 70° from normal to the first major surface (e.g., 20° to 55°, or 30° to 55°, or 10° or less, or less than, equal to, or greater than 12°, 14°, 16°, 18°, 20°, 22°, 240, 26°, 28°, 30°, 31°, 32°, 33°, 34°, 35°, 36°, 37°, 38°, 39°, 40°, 41°, 42°, 43°, 44°, 45°, 46°, 47°, 48°, 490, 50°, 510, 52°, 53°, 54°, 55°, 56°, 58°, 60°, 62°, 64°, 66°, 68°, or 70° or more).

10A. The multilayer optical film of any preceding A Exemplary Embodiment, wherein the isotropic multilayer optical film reflects 0% of the light having an incident angle of greater than 55° from normal to the first major surface of the isotropic multilayer optical film.

11A. The multilayer optical film of any preceding A Exemplary Embodiment, wherein the isotropic multilayer optical film reflects 50% to 100% (in some embodiments, at least 55%, 60, 65, 70, 75, 80, 85, 90, 95, 96, 97, 98%, or 99% or more) of a light that is at least one of ultraviolet light or visible light, having an incident angle less than a cutoff angle from normal to the first major surface of the isotropic multilayer optical film.

12A. The multilayer optical film of any preceding A Exemplary Embodiment, wherein the isotropic multilayer optical film allows 50% to 100% (in some embodiments, at least 55%, 60, 65, 70, 75, 80, 85, 90, 95, 96, 97, 98%, or 99% or more) of the light having an incident angle of more than the cutoff angle from normal to the first major surface of the isotropic multilayer optical film to pass through the isotropic multilayer optical film.

13A. The multilayered optical film of any preceding A Exemplary Embodiment, wherein the isotropic multilayer optical film has a thickness in a range from 1 micrometer to 500 micrometers (e.g., 1 micrometer or less, 10 micrometers to 50 micrometers, or less than, equal to, or greater than 2, 3, 4, 5, 6, 8, 10, 12, 14, 16, 18, 20, 25, 30, 35, 40, 45, 50, 60, 70, 80, 90, 100, 125, 150, 175, 200, 250, 300, 400, or 500 micrometers or more).

14A. The multilayered optical film of any preceding A Exemplary Embodiment, wherein the isotropic multilayer optical film has a total number of layers in a range from 10 to 2,000 layers (e.g., 20 to 700 layers, or 10 layers or less, or less than, equal to, or greater than 20, 30, 40, 50, 60, 70, 80, 90, 100, 110, 120, 130, 140, 150, 200, 220, 240, 260, 280, 300, 320, 340, 360, 380, 400, 420, 440, 460, 480, 500, 520, 540, 560, 580, 600, 620, 640, 680, 700, 750, 800, 850, 900, 950, 1,000, 1,100, 1,200, 1,400, 1,600, 1,800, or 2,000 layers or more).

15A. The multilayered optical film of any preceding A Exemplary Embodiment, wherein the isotropic multilayer optical film comprises alternating first optical layers and second optical layers, wherein the first layers have a first composition and the second layers have a second, different, composition, and wherein the first layers have a first refractive index and the second layers have a second, different, refractive index.

16A. The multilayered optical film of Exemplary Embodiment 15A, wherein each of the first and second optical layers independently have a thickness in a range from 2 nm to 300 nm (e.g., 50 nm to 200 nm, or 2 nm or less, or less than, equal to, or greater than 3, 4, 5, 6, 8, 10, 12, 14, 16, 18, 20, 25, 30, 35, 40, 45, 50, 60, 70, 80, 90, 100, 120, 140, 160, 180, 200, 220, 240, 250 nm, or 300 nm or more).

17A. The multilayer optical film of any preceding A Exemplary Embodiment, wherein the isotropic multilayer optical film is at least one of an isotropic polymeric multilayer optical film or an isotropic inorganic multilayer optical film.

18A. The multilayered optical film of any preceding A Exemplary Embodiment, wherein the isotropic multilayer optical film is an isotropic polymeric multilayer optical film comprising a plurality of alternating first and second polymeric optical layers, wherein the first polymeric optical layers have a first composition and the second optical polymeric layers have a second, different, composition, and wherein the first optical polymeric layers have a first refractive index and the second optical polymeric layers have a second, different, refractive index.

19A. The multilayered optical film of Exemplary Embodiment 18A, wherein the first and second polymeric optical layers independently comprise at least one of a polycarbonate, an epoxy-containing polymer, a poly(epoxy-containing monomer), a vinyl polymer, a cyclic olefin polymer, a poly(phenylene oxide), a polysulfone, a polyamide, a polyurethane, a polyethylene, a polypropylene, a polyamic acid, a polyimide, a polyester, a fluoropolymer, a polydimethylsiloxane, a poly(alkylene terephthalate), a poly(alkylene napthalate), a silicone polymer, a cellulose derivative, an ionomer, or a copolymer thereof.

20A. The multilayered optical film of either Exemplary Embodiment 18A or 19A, wherein the first polymeric optical layer is polycarbonate and the second polymeric optical layer is a blend of poly(methyl methacrylate) and polyvinylidene fluoride.

21A. The multilayered optical film of Exemplary Embodiment 20A, wherein the second polymeric optical layer is a 1:1 by weight blend of poly(methyl methacrylate) and polyvinylidene fluoride.

22A. The multilayer optical film of any preceding A Exemplary Embodiment, wherein the isotropic multilayer optical film is an isotropic inorganic multilayer optical film comprising a plurality of first and second inorganic optical layers, wherein the first inorganic optical layers have a first composition and the second optical inorganic layers have a second, different, composition, and wherein the first optical inorganic layers have a first refractive index and the second optical inorganic layers have a second, different, refractive index.

23A. The multilayer optical film of Exemplary Embodiment 22A, wherein the first inorganic optical layer and the second inorganic optical layer independently comprise at least one of titania, silica, zirconia, alumina, ceria, antimony oxide, hafnia, zinc selenide, sodium alumina fluoride, zinc oxide, lanthanum oxide, or tantalum oxide.

24A. The multilayered optical film of any preceding A Exemplary Embodiment, wherein the marking comprising the fluorescent compound is at least one of a picture, a shape, a design, a pattern, a letter, a word, an indicia, a graphical image, or a layer.

25A. The multilayered optical film of any preceding A Exemplary Embodiment, wherein the fluorescent compound has an excitation band in the ultraviolet light range and has an emission band in at least one of the visible light range or the near-infrared light range.

26A. The multilayered optical film of any preceding A Exemplary Embodiment, wherein the at least one fluorescent compound comprises a first fluorescent compound having an excitation band in the range of 350 nm to 400 nm and a second fluorescent compound having an excitation band in the range of 300 nm to 350 nm.

1B. A multilayered optical film-structured surface composite comprising:

the multilayered optical film of any preceding A Exemplary Embodiment; and a structured surface having a first major surface and a second, opposed major surface, the second major surface of the structured surface being in contact with or proximate to the first major surface of the isotropic multilayer optical film, wherein the structured surface redirects the light approaching the first major surface of the structured surface such that the light entering the first major surface of the structured surface has an incident angle with respect to the first major surface of the structured surface that is different than the angle of light exiting the second major surface of the structured surface with respect to the first major surface of the isotropic multilayer optical film.

2B. The multilayered optical film-structured surface composite of Exemplary Embodiment 1B, wherein an angle of light exiting the second major surface of the structured surface with respect to the first major surface of the isotropic multilayer optical film differs from an incident angle of the light entering the first major surface of the structured surface by an amount equal to a redirection angle.

3B. The multilayered optical film-structured surface composite of Exemplary Embodiment 2B, wherein the multilayered optical film-structured surface composite:

reflects at least 50% (e.g., 50% to 100%, or at least 55%, 60, 65, 70, 75, 80, 85, 90, 95, 96, 97, 98%, or 99% or more) of the light having an incident angle less than the cutoff angle minus the redirection angle from normal to the first major surface of the isotropic multilayer optical film, and allows at least 50% (e.g., 50% to 100%, or at least 55%, 60, 65, 70, 75, 80, 85, 90, 95, 96, 97, 98%, or 99% or more) of the light having an incident angle of more than the cutoff angle minus the redirection angle from normal to the first major surface of the isotropic multilayer optical film to pass through the structured surface and the isotropic multilayer optical film.

4B. The multilayered optical film-structured surface composite of either Exemplary Embodiment 2B or 3B, wherein the redirection angle is in a range from 10° to 80° (e.g., 15° to 25°, or 10° or less, or 120, 14°, 15°, 16°, 17°, 18°, 19°, 20°, 21°, 22°, 23°, 24°, 25°, 26°, 28°, 30°, 32°, 34°, 36°, 38°, 40°, 42°, 440, 46°, 48°, 50°, 52°, 54°, 56°, 58°, 60°, 62°, 64°, 66°, 68°, 70°, 72°, 74°, 76°, 78°, or 80° or more).

5B. The multilayered optical film-structured surface composite of any of Exemplary Embodiments 1B to 4B, wherein the structured surface redirects the light at least one of via refraction or total internal reflection.

6B. The multilayered optical film-structured surface composite of any of Exemplary Embodiments 1B to 4B, wherein at least some portions of the fluorescent marking on the second major surface of the isotropic multilayer optical film are directly opposite the structured surface on the first major surface of the isotropic multilayer optical film.

7B. The multilayered optical film-structured surface composite of Exemplary Embodiment 6B, wherein the multilayered optical film-structured surface composite allows at least some of the light that approaches the first major surface of the structured surface at an incident angle that is normal to the first major surface of the isotropic multilayer optical film to pass through the structured surface and the isotropic multilayer optical film and causes at least some of the portions of the fluorescent marking on the second major surface of the isotropic multilayer optical film that are directly opposite the structured surface on the first major surface of the isotropic multilayer optical film to fluoresce.

8B. The multilayered optical film-structured surface composite of any one of Exemplary Embodiments 1B to 7B, wherein at least some portions of the fluorescent marking on the second major surface of the isotropic multilayer optical film are not directly opposite the structured surface on the first major surface of the isotropic multilayer optical film.

9B. The multilayered optical film-structured surface composite of Exemplary Embodiment 8B, wherein the multilayered optical film-structured surface composite reflects the light that approaches portions of the first major surface of the isotropic multilayer optical film that are free of the structured surface at an incident angle that is normal to the first major surface of the isotropic multilayer optical film and thereby prevents at least some of the portions of the fluorescent marking on the second major surface of the isotropic multilayer optical film that are not directly opposite the structured surface on the first major surface of the isotropic multilayer optical film from fluorescing.

10B. The multilayered optical film-structured surface composite of any of Exemplary Embodiments 1B to 9B, wherein at least some portions of the fluorescent marking on the second major surface of the isotropic multilayer optical film are directly opposite the structured surface on the first major surface of the isotropic multilayer optical film, and at least some portions of the fluorescent marking on the second major surface of the isotropic multilayer optical film are not directly opposite the structured surface on the first major surface of the isotropic multilayer optical film.

11B. The multilayered optical film-structured surface composite of Exemplary Embodiment 10B, wherein the multilayered optical film-structured surface composite:

allows at least some of the light that approaches the first major surface of the structured surface at an incident angle that is normal to the first major surface of the isotropic multilayer optical film to pass through the structured surface and the isotropic multilayer optical film and causes at least some of the portions of the fluorescent marking on the second major surface of the isotropic multilayer optical film that are directly opposite the structured surface on the first major surface of the isotropic multilayer optical film to fluoresce, reflects the light that approaches portions of the first major surface of the isotropic multilayer optical film that are free of the structured surface at an incident angle that is normal to the first major surface of the isotropic multilayer optical film and thereby prevents at least some of the portions of the fluorescent marking on the second major surface of the isotropic multilayer optical film that are not directly opposite the structured surface on the first major surface of the isotropic multilayer optical film from fluorescing, and allows at least some of the light that approaches the first major surface of the structured surface and that approaches the first major surface of the isotropic multilayer optical film at an incident angle to the first major surface of the isotropic multilayer optical film that is different than normal to the first major surface of the isotropic multilayer optical film to pass through the structured surface and the isotropic multilayered optical film and causes fluorescence of at least some of both of the portions of the fluorescent marking on the second major surface of the isotropic multilayer optical film that are directly opposite the structured surface on the first major surface of the isotropic multilayer optical film and the portions of the fluorescent marking on the second major surface of the isotropic multilayer optical film that are not directly opposite the structured surface on the first major surface of the isotropic multilayer optical film.

1C. A method of using the multilayer optical film of any preceding A or B Exemplary Embodiment, the method comprising:
  illuminating the first major surface of the isotropic multilayer optical film with the light; and
  detecting whether the marking fluoresces.

2C. The method of Exemplary Embodiment 1C, further comprising generating the light using an ultraviolet light source.

3C. The method of any of Exemplary Embodiments 1C to 2C, further comprising generating the light using a visible light source.

4C. The method of any of Exemplary Embodiments 1C to 3C, wherein detecting comprises visual detection with the eye.

5C. The method of any of Exemplary Embodiments 1C to 4C, wherein detecting comprises electronic detection with a detector.

1D. A method of making the multilayer optical film of any preceding A Exemplary Embodiment, the method comprising:
  applying the marking to the second major surface of the isotropic multilayer optical film to form the multilayer optical film.

1E. A method of making the multilayer optical film-structured material composite of any preceding B Exemplary Embodiment, the method comprising:
  applying the second major surface of the structured material to the first major surface of the multilayer optical film to form the multilayer optical film-structured material composite.

1F. A multilayer optical film comprising:
  an isotropic polymeric multilayer optical film having a first and second, opposed major surfaces comprising in a range of 10 to 2,000 layers total (in some embodiments, 20 to 700 layers, or 10 layers or less, or less than, equal to, or greater than 20, 30, 40, 50, 60, 70, 80, 90, 100, 110, 120, 130, 140, 150, 200, 220, 240, 260, 280, 300, 320, 340, 360, 380, 400, 420, 440, 460, 480, 500, 520, 540, 560, 580, 600, 620, 640, 680, 700, 750, 800, 850, 900, 950, 1,000, 1,100, 1,200, 1,400, 1,600, 1,800, or 2,000 layers or more) of alternating first and second polymeric optical layers, wherein the first polymeric optical layers have a first composition and the second polymeric optical layers have a second, different, composition, wherein the isotropic multilayer optical film:
    reflects at least 50% (e.g., 50% to 100%, or at least 55%, 60, 65, 70, 75, 80, 85, 90, 95, 96, 97, 98%, or 99% or more) of a light that is ultraviolet light having an incident angle less than a cutoff angle from normal to the first major surface of the isotropic polymeric multilayer optical film, wherein the cutoff angle is in a range from 20° to 55° (e.g., 10° to 70°, 20° to 55°, 30° to 55°, or 10° or less, or less than, equal to, or greater than 12°, 14°, 16°, 18°, 20°, 22°, 24°, 26°, 28°, 30°, 32°, 34°, 36°, 38°, 40°, 42°, 44°, 46°, 48°, 50°, 52°, 54°, 56°, 58°, 60°, 62°, 64°, 66°, 68°, or 70° or more), and allows at least 50% (e.g., 50% to 100%, or at least 55%, 60, 65, 70, 75, 80, 85, 90, 95, 96, 97, 98%, or 99% or more) of the light having an incident angle of more than the cutoff angle from normal to the first major surface of the isotropic polymeric multilayer optical film to pass through the isotropic multilayer optical film; and
  a marking on the second major surface of the isotropic polymeric multilayer optical film, the marking comprising a fluorescent compound.

1G. A multilayered optical film-structured surface composite comprising:
  an isotropic polymeric multilayer optical film having a first and second, opposed major surfaces comprising 10 to 2,000 layers total (in some embodiments, 20 to 700 layers, or 10 layers or less, or less than, equal to, or greater than 20, 30, 40, 50, 60, 70, 80, 90, 100, 110, 120, 130, 140, 150, 200, 220, 240, 260, 280, 300, 320, 340, 360, 380, 400, 420, 440, 460, 480, 500, 520, 540, 560, 580, 600, 620, 640, 680, 700, 750, 800, 850, 900, 950, 1,000, 1,100, 1,200, 1,400, 1,600, 1,800, or 2,000 layers or more) of alternating first and second polymeric optical layers, wherein the first polymeric optical layers have a first composition and the second polymeric optical layers have a second, different, composition, wherein the isotropic multilayer optical film:
    reflects at least 50% (e.g., 50% to 100%, or at least 55%, 60, 65, 70, 75, 80, 85, 90, 95, 96, 97, 98%, or 99% or more) of a light that is ultraviolet light having an incident angle less than a cutoff angle from normal to the first major surface of the isotropic polymeric multilayer optical film, wherein the cutoff angle is in a range from 20° to 55° (e.g., 10° to 70°, 20° to 55°, 30° to 55°, or 10° or less, or less than, equal to, or greater than 12°, 14°, 16°, 18°, 20°, 22°, 24°, 26°, 28°, 30°, 32°, 34°, 36°, 38°, 40°, 42°, 44°, 46°, 48°, 50°, 52°, 54°, 56°, 58°, 60°, 62°, 64°, 66°, 68°, or 70° or more), and allows at least 50% (e.g., 50% to 100%, or at least 55%, 60, 65, 70, 75, 80, 85, 90, 95, 96, 97, 98%, or 99% or more) of the light having an incident angle of more than the cutoff angle from normal to the first major surface of the isotropic polymeric multilayer optical film to pass through the isotropic multilayer optical film;
  a marking on the second major surface of the isotropic polymeric multilayer optical film, the marking comprising a fluorescent compound; and
  a structured surface having a first major surface and a second major surface, the second major surface of the structured surface being in contact with the first major surface of the isotropic multilayer optical film, wherein the structured surface redirects the light approaching the first major surface of the structured surface such that the light entering the first major surface of the structured surface has an incident angle with respect to the first major surface of the structured surface that is different than the angle of light exiting the second major surface of the structured surface with respect to the first major surface of the isotropic multilayer optical film.

EXAMPLES

Various embodiments of the present invention can be better understood by reference to the following Examples which are offered by way of illustration. The present invention is not limited to the Examples given herein.

Table 1, below, describes materials used in these Examples.

TABLE 1

| Abbreviation | Source | Description |
| --- | --- | --- |
| PC1 | Obtained under the trade designation "MAKROLON 2207" from Bayer, Leverkusen, Germany | Polycarbonate |
| PMMA1 | Obtained under the trade designation "VO44" from Arkema, King of Prussia, PA | Poly(methyl methacrylate) |
| PMMA2 | Obtained under the trade designation "CP82 LLG CLEAR" from Plaskolite, Columbus, OH | Poly(methyl methacrylate) |
| PVDF | Obtained under the trade designation "PVDF6008" from 3M Company, St. Paul, MN | Polyvinylidene fluoride |
| F1 | Obtained under the trade designation "ADA4625" from H.W. Sands Corporation, Jupiter, FL | A fluorescent material having an excitation wavelength of 365 nm and an excitation wavelength of 615 nm (red) |
| F2 | Obtained under the trade designation "TINOPAL OB CO" from BASF, Florham Park, NJ | Fluorescent material 2,5-thiophenediylbis(5-tert-butyl-1,3-benzoxazole) having an excitation wavelength of about 375 nm and an excitation wavelength of about 440 nm (blue) |
| IDFII | Obtained under the trade designation "3M IMAGE DIRECTING FILM II" from 3M Company, St. Paul, MN | A film having sawtooth prisms with 20° deviation angle on one side so that light from normal incidence is redirected at 20° from normal out the non-structured side of the film |

Example 1 Multilayer Optical Film

A multilayer optical UV mirror film was made by coextruding 550 alternating layers of PC1 and a 50:50 polymer blend of PMMA1 and PVDF through a multilayer polymer melt manifold extrusion and casting onto a chilled roll. In addition to these optical layers, non-optical protective skin layers of PC1 were coextruded on either side of the optical stack. This multilayer coextruded melt stream was cast onto a chilled roll at 25 meters per minute creating a multilayer cast web about 100 micrometers (4 mils) thick. The multilayer cast web was then preheated for about 10 seconds at 171° C. and biaxially oriented at a draw ratio of 1.5×1.8.

The layer thickness profile (layer thickness values) of this UV reflector was adjusted to be approximately a linear profile with the first (thinnest) optical layers adjusted to have about a ¼ wave optical thickness (index times physical thickness) for 320 nm light and progressing to the thickest layers which were adjusted to be about ¼ wave thick optical thickness for 400 nm light. Layer thickness profiles of such films were adjusted to provide for improved spectral characteristics using the axial rod apparatus taught in U.S. Pat. No. 6,783,349 (Neavin et al.), the disclosure of which is incorporated herein by reference, using layer profile information obtained with microscopic techniques. The UV mirror film had a final thickness of 22.5 micrometers.

Figure 2:
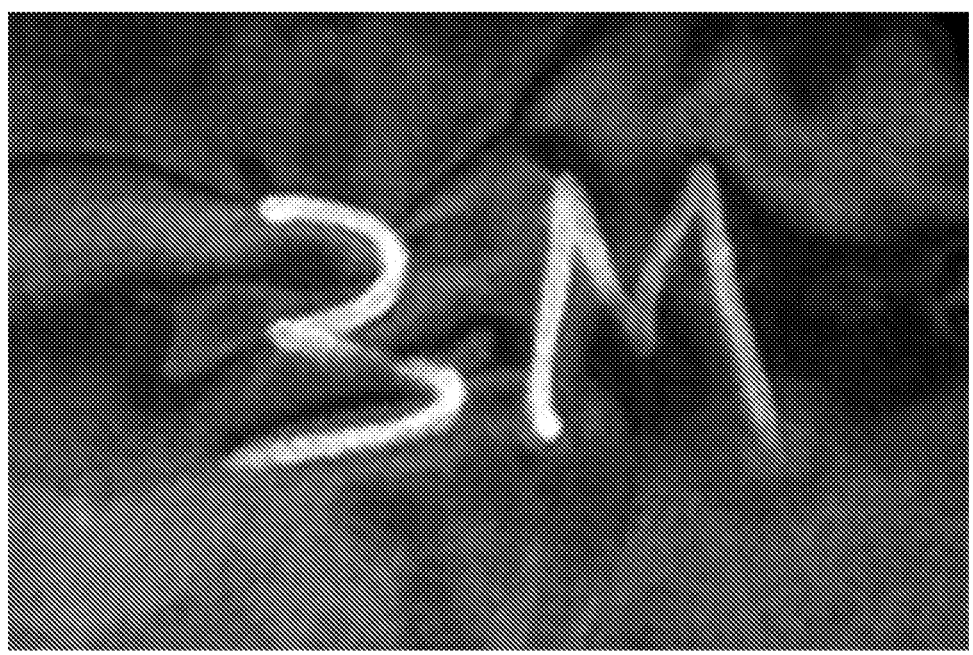
FIG. 2 illustrates an exemplary multilayer optical film described herein that is UV illuminated at an angle of 45° from normal to the surface of the film, showing fluorescence of the fluorescent markings on the back side of the film.

A clear to red visible effect was created by coating the symbol "3M" with 1 wt. % F1 dissolved in a solution of 80 wt. % ethyl acetate and 19 wt. % PMMA2 on the bottom of the described UV mirror film and illuminating from the first (front) side at normal and 45° to the surface of the film with 366 nm light as shown in FIGS. 1 and 2. The fluorescent markings were not visible when illuminated at an angle normal to the front surface of the film, but were visible when illuminated at 45° from normal to the front surface of the film.

Example 2 Multilayered Optical Film-Structured Surface Composite

Another effect was created by placing pieces of IDFII on top of a sheet of the UV mirror film described in Example 1 (without the fluorescent markings of Example 1) with a blue fluorescent layer coated on the back side of the UV mirror, having a composition described in Table 2, below.

TABLE 2

| PMMA2, wt. % | F2, wt. % | Ethyl Acetate, wt. % |
| --- | --- | --- |
| 19 | 1 | 80 |

Figure 3:
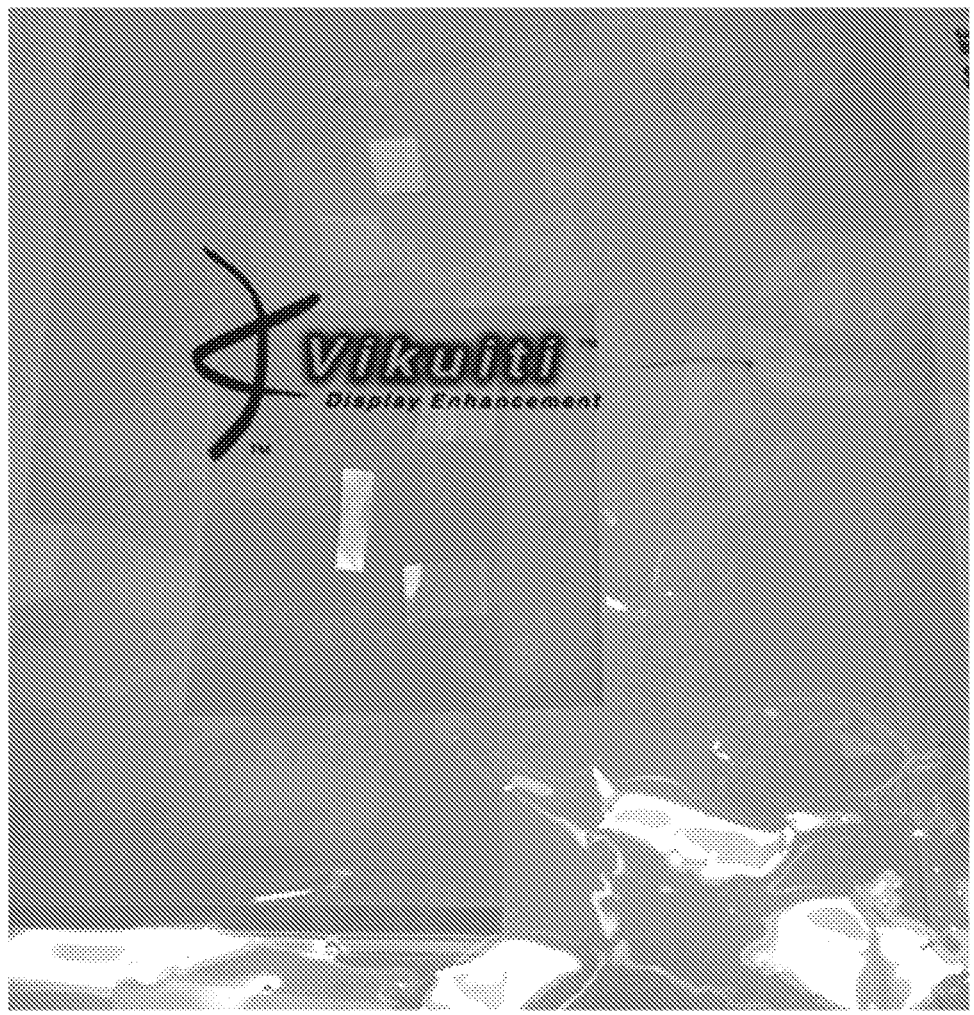
FIG. 3 illustrates an exemplary multilayered optical film-structured surface composite described herein illuminated using regular white light.

The colorless UV mirror film with IDFII is shown in regular room light in FIG. 3.

Figure 4:
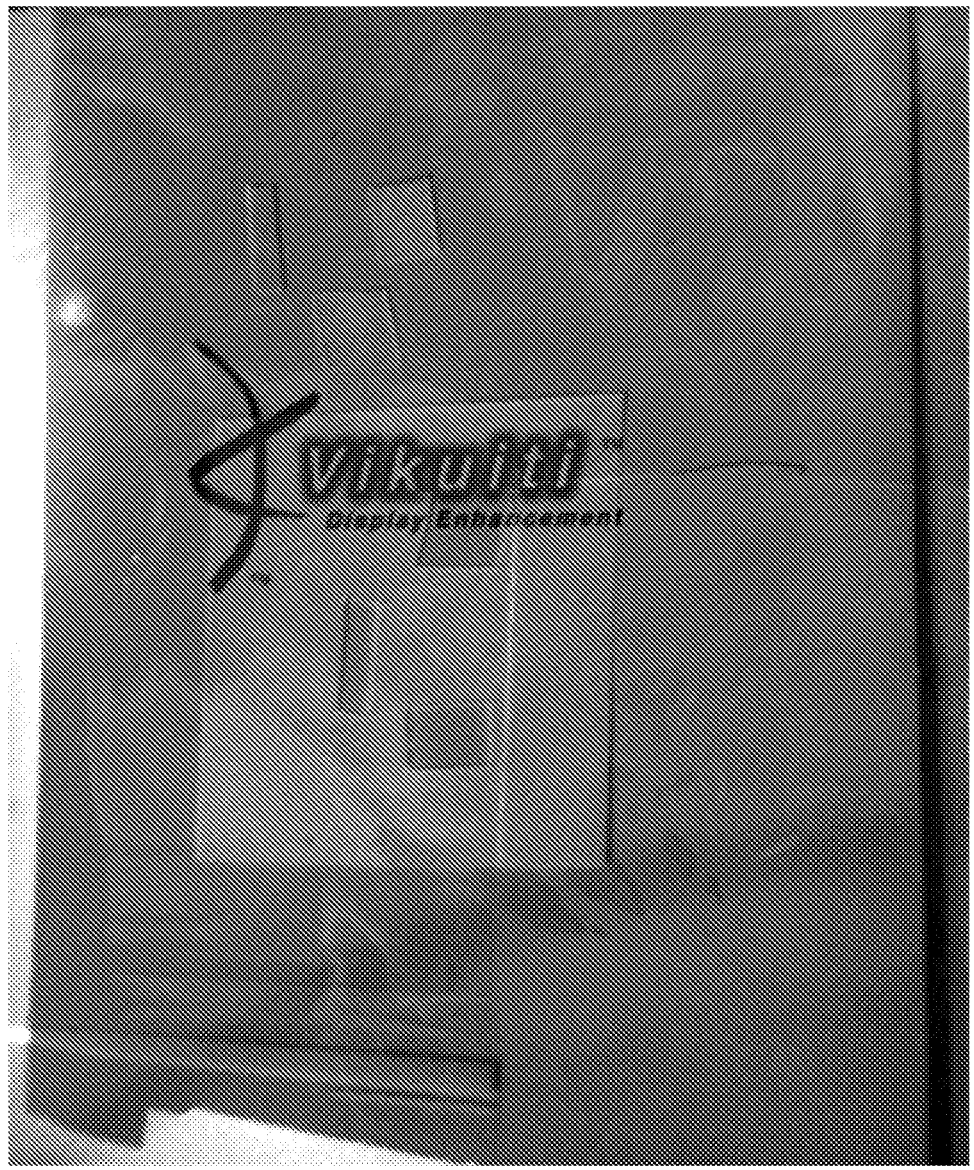
FIG. 4 illustrates an exemplary multilayered optical film-structured surface composite described herein illuminated using ultraviolet light at an angle normal to the surface of the film, showing fluorescence of the fluorescent markings on the back side of the film underneath the structured surface.
Figure 5:
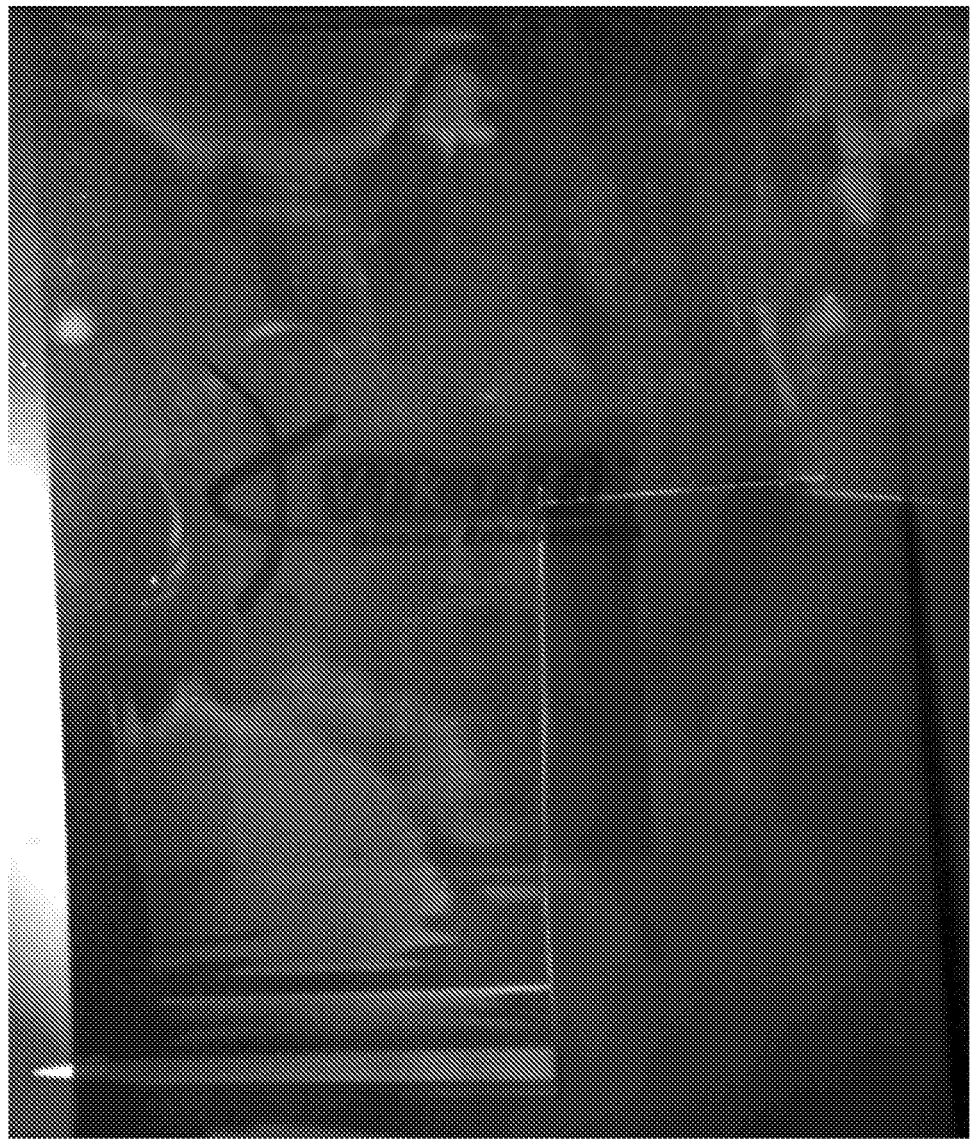
FIG. 5 illustrates an exemplary multilayered optical film-structured surface composite described herein illuminated using ultraviolet light at an angle 45° from normal to the surface of the film, showing fluorescence of both the fluorescent markings on the back side of the film underneath the structured surface and the fluorescent markings on the back side of the film that are not underneath the structured surface.

A 366 nm UV lamp was directed at normal incidence toward the films and the IDFII redirects the UV light at 20° so that there was less reflectivity of the UV wavelengths and the UV light passed through and excited the blue fluorescent layer in the zones underneath the IDFII pieces, as shown in FIG. 4. When the UV lamp (366 nm) was held at 45° incidence angle the entire background and zones with IDFII were excited, as shown in FIG. 5, and a loss of contrast between the IDFII zones and the background occurred.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

What is claimed is:

1. A multilayer optical film comprising:
an isotropic multilayer optical film having first and second opposed major surfaces, wherein the isotropic multilayer optical film comprises alternating first and second optical polymeric layers, wherein the first optical polymeric layers have a first composition and the second optical polymeric layers have a second, different, composition, and wherein the first layers have a first refractive index and the second layers have a second, different, refractive index, wherein the first optical layers include a fluoropolymer and the second optical layers include at least one of a polycarbonate, an epoxy-containing polymer, a poly(epoxy-containing monomer), a vinyl polymer, a cyclic olefin polymer, a poly(phenylene oxide), a polysulfone, a polyamide, a polyurethane, a polyethylene, a polypropylene, a polyamic acid, a polyimide, a polyester, a fluoropolymer, a polydimethylsiloxane, a poly(alkylene terephthalate), a poly(alkylene napthalate), a silicone polymer, a cellulose derivative, an ionomer, or a copolymer thereof, and wherein the isotropic multilayer optical film:
reflects at least 50% of a light that is at least one of ultraviolet light or visible light, having an incident angle less than a cutoff angle from normal to the first major surface of the isotropic multilayer optical film, wherein the cutoff angle is in a range from 10° to 70°, and
allows at least 50% of the light having an incident angle of more than the cutoff angle from normal to the first major surface of the isotropic multilayer optical film to pass through the isotropic multilayer optical film; and
a marking on the second major surface of the isotropic multilayer optical film, the marking comprising at least one fluorescent compound.

2. The multilayer optical film of claim 1, wherein the light approaching the first major surface of the isotropic multilayer optical film and having an incident angle greater than the cutoff angle from normal to the first major surface of the isotropic multilayer optical film passes through the film and causes the fluorescent compound to fluoresce.

3. The multilayer optical film of claim 2, wherein the fluorescing of the fluorescent compound occurs in at least one of the visible light range and the near infrared light range and is visible from the first major surface of the isotropic multilayer optical film.

4. The multilayer optical film of claim 1, wherein the marking is free of fluorescence from the light having an incident angle to the first major surface of the isotropic multilayer optical film less than an invisibility angle from normal to the first major surface of the isotropic multilayer optical film, wherein the invisibility angle is in a range from 5° to 30°.

5. The multilayered optical film of claim 1, wherein the marking comprising the fluorescent compound is at least one of a picture, a shape, a design, a pattern, a letter, a word, an indicia, a graphical image, or a layer.

6. The multilayered optical film of claim 1, wherein the at least one fluorescent compound comprises a first fluorescent compound having an excitation band in the range of 350 nanometers to 400 nanometers and a second fluorescent compound having an excitation band in the range of 300 nanometers to 350 nanometers.

7. A multilayered optical film-structured surface composite comprising:
the multilayered optical film of claim 1; and
a structured surface having a first major surface and a second, opposed major surface, the second major surface of the structured surface being in contact with or proximate to the first major surface of the isotropic multilayer optical film, wherein the structured surface redirects the light approaching the first major surface of the structured surface such that the light entering the first major surface of the structured surface has an incident angle with respect to the first major surface of the structured surface that is different than the angle of light exiting the second major surface of the structured surface with respect to the first major surface of the isotropic multilayer optical film.

8. The multilayered optical film-structured surface composite of claim 7, wherein an angle of light exiting the second major surface of the structured surface with respect to the first major surface of the isotropic multilayer optical film differs from an incident angle of the light entering the first major surface of the structured surface by an amount equal to a redirection angle, and wherein the multilayered optical film-structured surface composite:
reflects at least 50% of the light having an incident angle less than the cutoff angle minus the redirection angle from normal to the first major surface of the isotropic multilayer optical film, and
allows at least 50% of the light having an incident angle of more than the cutoff angle minus the redirection angle from normal to the first major surface of the isotropic multilayer optical film to pass through the structured surface and the isotropic multilayer optical film.

9. A method of using the multilayer optical film of claim 1, the method comprising:
illuminating the first major surface of the isotropic multilayer optical film with the light; and
detecting whether the marking fluoresces.

10. A method of making the multilayer optical film of claim 1, the method comprising:
applying the marking to the second major surface of the isotropic multilayer optical film to form the multilayer optical film.

11. A method of making the multilayer optical film-structured material composite of claim 7, the method comprising:
applying the second major surface of the structured material to the first major surface of the multilayer optical film to form the multilayer optical film-structured material composite.

12. A multilayer optical film comprising:
an isotropic polymeric multilayer optical film having a first and second, opposed major surfaces comprising in a range of 10 to 2,000 layers total of alternating first and second polymeric optical layers, wherein the first polymeric optical layers have a first composition and the second polymeric optical layers have a second, different, composition, wherein the first optical polymeric layers have a first composition and the second optical polymeric layers have a second, different, composition, and wherein the first layers have a first refractive index and the second layers have a second, different, refractive index, wherein the first optical layers include a fluoropolymer and the second optical layers include at least one of a polycarbonate, an epoxy-containing polymer, a poly(epoxy-containing monomer), a vinyl polymer, a cyclic olefin polymer, a poly(phenylene oxide), a polysulfone, a polyamide, a polyurethane, a polyethylene, a polypropylene, a polyamic acid, a polyimide, a polyester, a fluoropolymer, a polydimethylsiloxane, a poly(alkylene terephthalate) poly(alkylene napthalate), a silicone polymer, a cellulose derivative, an ionomer, or a copolymer thereof, and wherein the isotropic multilayer optical film:
  reflects at least 50% of a light that is ultraviolet light having an incident angle less than a cutoff angle from normal to the first major surface of the isotropic polymeric multilayer optical film, wherein the cutoff angle is in a range from 20° to 55°, and
  allows at least 50% of the light having an incident angle of more than the cutoff angle from normal to the first major surface of the isotropic polymeric multilayer optical film to pass through the isotropic multilayer optical film; and
  a marking on the second major surface of the isotropic polymeric multilayer optical film, the marking comprising a fluorescent compound.

13. A multilayered optical film-structured surface composite comprising:
  an isotropic polymeric multilayer optical film having a first and second, opposed major surfaces comprising 10 to 2,000 layers total of alternating first and second polymeric optical layers, wherein the first polymeric optical layers have a first composition and the second polymeric optical layers have a second, different, composition, wherein the first layers have a first refractive index and the second layers have a second, different, refractive index, wherein the first optical layers include a fluoropolymer and the second optical layers include at least one of a polycarbonate, an epoxy-containing polymer, a poly(epoxy-containing monomer), a vinyl polymer, a cyclic olefin polymer, a poly(phenylene oxide), a polysulfone, a polyamide, a polyurethane, a polyethylene, a polypropylene, a polyamic acid, a polyimide, a polyester, a fluoropolymer, a polydimethylsiloxane, a poly(alkylene terephthalate), a poly(alkylene napthalate), a silicone polymer, a cellulose derivative, an ionomer, or a copolymer thereof, and wherein the isotropic multilayer optical film:
    reflects at least 50% of a light that is ultraviolet light having an incident angle less than a cutoff angle from normal to the first major surface of the isotropic polymeric multilayer optical film, wherein the cutoff angle is in a range from 20° to 55°, and
    allows at least 50% of the light having an incident angle of more than the cutoff angle from normal to the first major surface of the isotropic polymeric multilayer optical film to pass through the isotropic multilayer optical film;
  a marking on the second major surface of the isotropic polymeric multilayer optical film, the marking comprising a fluorescent compound; and
  a structured surface having a first major surface and a second major surface, the second major surface of the structured surface being in contact with the first major surface of the isotropic multilayer optical film, wherein the structured surface redirects the light approaching the first major surface of the structured surface such that the light entering the first major surface of the structured surface has an incident angle with respect to the first major surface of the structured surface that is different than the angle of light exiting the second major surface of the structured surface with respect to the first major surface of the isotropic multilayer optical film.

* * * * *

UNITED STATES PATENT AND TRADEMARK OFFICE
CERTIFICATE OF CORRECTION

PATENT NO. : 10,914,878 B2
APPLICATION NO. : 16/464123
DATED : February 9, 2021
INVENTOR(S) : Timothy Hebrink It is certified that error appears in the above-identified patent and that said Letters Patent is hereby corrected as shown below:

In the Specification

Column 5
Line 13, After "can" insert -- be --.

Column 5
Line 16, Delete "280," and insert -- 28°, --, therefor.

Column 5
Line 33, Delete "100, 11," and insert -- 10°, 11°, --, therefor.

Column 6
Line 40, Delete "napthalate)," and insert -- naphthalate), --, therefor.

Column 6
Line 44, Delete "isolactic" and insert -- isotactic --, therefor.

Column 6
Line 44, Delete "styrenes," and insert -- styrenes; --, therefor.

Column 6
Line 50, Delete "materials," and insert -- materials; --, therefor.

Column 6
Line 52, Delete "epoxies," and insert -- epoxies; --, therefor.

Column 6
Lines 59 – 60, Delete "napthalates)," and insert -- naphthalates), --, therefor.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*

Column 6
Line 60, Delete ")(" and insert -- ) ( --, therefor.

Column 6
Line 60, Delete "polyamide," and insert -- polyamide; --, therefor.

Column 7
Line 27, Delete "napthalate)." and insert -- naphthalate). --, therefor.

Column 8
Line 26, Delete "440," and insert -- 44°, --, therefor.

Column 10
Line 32, Delete "550," and insert -- 55°, --, therefor.

Column 10
Line 34, Delete "440," and insert -- 44°, --, therefor.

Column 11
Line 25, Delete "240," and insert -- 24°, --, therefor.

Column 11
Line 26, Delete "490," and insert -- 49°, --, therefor.

Column 11
Line 27, Delete "510," and insert -- 51°, --, therefor.

Column 12
Line 39, Delete "napthalate)," and insert -- naphthalate), --, therefor.

Column 13
Line 56, Delete "120," and insert -- 12°, --, therefor.

Column 13
Line 58, Delete "440," and insert -- 44°, --, therefor.

In the Claims

Column 19
Line 24, In Claim 1, delete "napthalate)," and insert -- naphthalate), --, therefor.

Column 21
Line 7, In Claim 12, delete "terephthalate)" and insert -- terephthalate), a --, therefor.

Column 21
Line 8, In Claim 12, delete "napthalate)," and insert -- naphthalate), --, therefor.

CERTIFICATE OF CORRECTION (continued)
U.S. Pat. No. 10,914,878 B2

Column 22
Line 7, In Claim 13, delete "napthalate)," and insert -- naphthalate), --, therefor.